May 2, 1950     T. R. HALL     2,506,213

BUTTER MOLD

Filed April 8, 1949

T. R. Hall
INVENTOR

BY *Cashrow & Co.*

ATTORNEYS.

Patented May 2, 1950

2,506,213

UNITED STATES PATENT OFFICE 2,506,213

BUTTER MOLD

Thomas R. Hall, Burlington, N. C.

Application April 8, 1949, Serial No. 86,335

1 Claim. (Cl. 31—44)

By way of explanation, it might be stated that in molding butter in the usual hand operated butter mold, the butter adheres to the contacting surface of the follower forming a part of the butter mold, and which is used in ejecting the molded butter from the mold proper. It frequently happens that when removing the molded butter from the follower, the molded butter becomes so distorted that it is necessary to remold the butter resulting in a considerable loss of time.

It is therefore the primary object of the present invention, to provide a butter mold having a follower which is provided with a hand gripping means to permit the follower to be rotated prior to directing force to the molded butter to eject it from the mold, thereby separating the molded butter from the follower, permitting the molded butter to be removed from the mold without danger of distorting or disfiguring the molded butter.

Another object of the invention is to provide a mold wherein the follower shank is formed integral with the follower, and a cross bar forming a finger piece, is secured at the free end of the shank of the follower, the main portion of the mold being formed with an opening conforming to the shape of the cross bar or pin, to permit it to slide through the mold proper without the necessity of disconnecting the shank from the follower head of the mold.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
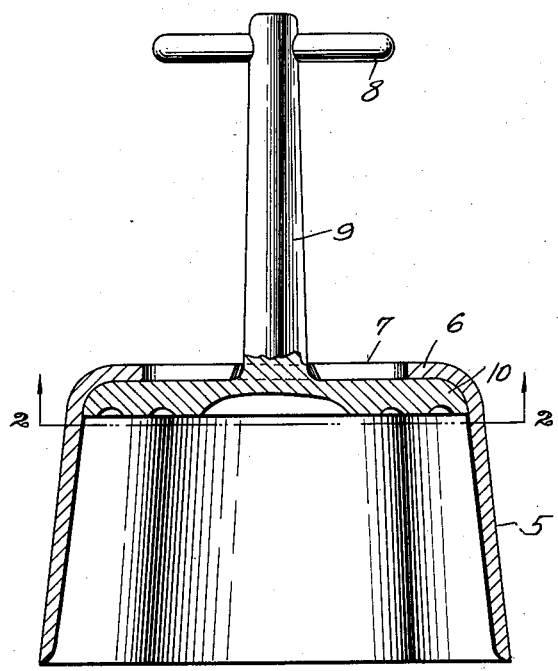
Figure 1 is a vertical sectional view through a mold, constructed in accordance with the invention, the follower of the mold being shown in section.
Figure 2:
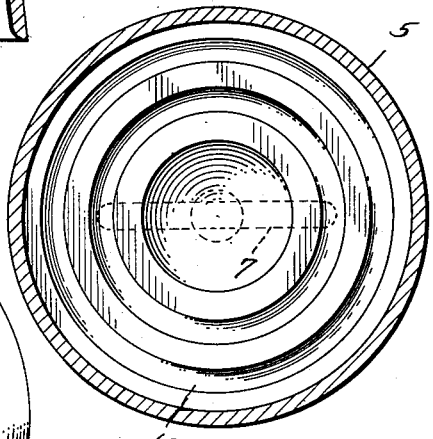
Fig. 2 is a sectional view taken on line 2—2 of Fig. 1.
Figure 3:
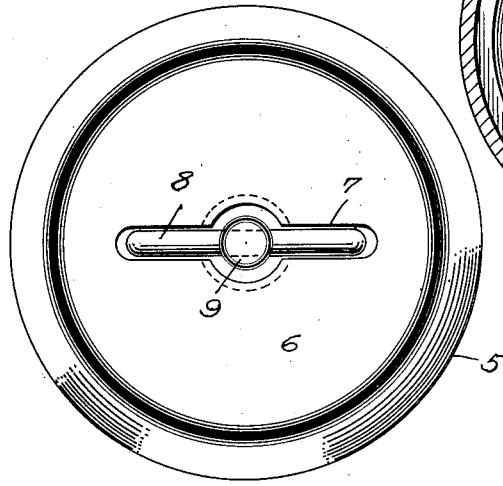
Fig. 3 is a plan view of the mold.

Referring to the drawing in detail, the mold comprises a main molding section or body portion indicated by the reference character 5, the mold being slightly flared outwardly in the usual and well known manner of mold construction.

The closed end 6 of the mold is provided with an elongated opening 7 to allow the cross pin 8 which is secured to the upper or free end of the follower shank 9, to pass through the closed end of the main molding section or body portion 5.

The reference character 10 indicates the follower head that normally rests against the closed end of the main molding section or body portion 5, the follower head being of a diameter substantially equal to the diameter of the closed end 6.

From the foregoing it will be seen that when the follower head has been moved to a position as shown by Fig. 1 of the drawing, and the butter to be molded is packed within the main molding section or body portion 5, the butter will be molded to the shape of the main molding section or body portion 5.

The cross pin 8 is now grasped in one hand and the main molding section or body portion is held in the other hand of the person operating the follower head to free the molded butter from the mold.

The shank 9 is now slightly rotated breaking the connection between the follower head 10 and the butter molded. The follower may now be forced towards the open end of the body portion with the result that the molded butter will be ejected from the main molding section or body portion without danger of distorting the shape of the molded butter.

Having thus described the invention, what is claimed is:

A butter mold comprising a hollow mold body having an end wall formed with an elongated opening, a follower operating within the mold body including a head, a shank formed integral with the head and rising from the central portion of the head, a cross pin secured to the shank at the free end thereof, said cross pin providing a finger piece whereby the follower may be rotated breaking the seal between the butter in the mold and follower head as the follower is forced through the mold, said cross pin being of a length and diameter slightly less than the elongated opening, and said cross pin being movable through the elongated opening when positioning the follower within the body of the mold, whereby said follower may be disconnected from the mold body.

THOMAS R. HALL.

REFERENCES CITED

The following references are of record in the file of this patent:

UNITED STATES PATENTS

| Number | Name | Date |
|---|---|---|
| 54,054 | Bullard | Apr. 17, 1866 |
| 564,375 | Greenough et al. | July 21, 1896 |
| 829,287 | Parker | Aug. 21, 1906 |
| 2,052,510 | Woolverton | Aug. 25, 1936 |

FOREIGN PATENTS

| Number | Country | Date |
|---|---|---|
| 128,571 | Germany | Feb. 26, 1902 |